United States Patent Office 2,904,588
Patented Sept. 15, 1959

2,904,588

FLUOROPHOSPHORANES AND THEIR PREPARATION

William C. Smith, Wilmington, Del., assignor to E. I. du Pont de Nemours and Company, Wilmington, Del., a corporation of Delaware No Drawing. Application March 26, 1956
Serial No. 573,659

15 Claims. (Cl. 260—543)

This invention relates to new compositions of matter and to their preparation.

Organic fluorine compounds have attained considerable importance in recent years and simple and economic methods for their preparation are greatly desired.

This invention has as an object the preparation of new fluorophosphoranes. A further object is the provision of a new process for their preparation. Another object is the prepartion of new polymerization catalysts. Other objects will appear hereinafter.

These objects are accomplished by the present invention of new fluorophosphoranes of the formula $$R_nPF_{5-n}$$

wherein R is a monovalent hydrocarbon radical and $n$ is an integer from 1 to 3 and of the process for the preparation of the same by reacting pentavalent antimony and a fluoride with a hydrocarbon phosphorus compound corresponding to $R_nPCl_{3-n}$, in which $n$ is 1 to 3 and R is a monovalent hydrocarbon radical.

In one method for preparing the fluorophosphoranes of this invention, the antimony fluoride is placed in a nitrogen-flushed reactor heated to between 40° and 120° C. and the hydrocarbon phosphorus compound is added dropwise at such rate as to maintain the temperature of the reaction mixture at the level selected for operation. After all the hydrocarbon phosphorus chloride has been added, the reaction mixture is subjected to distillation, usually at atmospheric pressure, to recover the desired hydrocarbon fluorophosphorane.

The following examples in which parts are by weight are illustrative of the invention.

EXAMPLE I

A 1000-ml. flask, equipped with a stirrer, thermometer, dropping funnel, and condenser was flushed with nitrogen and then charged with 119.0 g. (0.67 mole) of antimony trifluoride and 65.8 g. (0.22 mole) of antimony pentachloride. Phenylphosphonous dichloride (89.5 g.; 0.50 mole) was placed in the dropping funnel and added to the antimony trifluoride-antimony pentachloride mixture at such a rate that the reaction temperature was kept at about 70° C. The crude reaction product was filtered and the filtrate distilled at atmospheric pressure. A 25 ml. fraction boiling sharply at 134° C. was retained as product, and corresponded to phenyltetrafluorophosphorane.

Repetition of the above process, using equimolar amounts of phenylphosphonous dichloride and antimony pentachloride, together with an 11 mole percent excess of antimony trifluoride, gave similarly good results.

Analysis

Calculated for $C_6H_5F_4P$: C, 39.1%; H, 2.75%; F, 41.3%; P, 16.84%.
Found: C, 37.41%; H, 2.96%; F, 40.2%; P, 17.13%.

Three grams of the product prepared as described above was placed in a polyethylene bottle and 6 g. of water was added. After the initial exothermic reaction had subsided and the solution had cooled, a white crystalline solid separated. This solid was recrystallized twice from water. After drying, the product melted at 159° to 161° C. The melting point of benzenephosphonic acid is 159° to 161° C., and this is the product expected from the complete hydrolysis of phenyltetrafluorophosphorane.

Nuclear magnetic resonance examination of the phenyltetrafluorophosphorane showed it to have four equivalent fluorine atoms bound to phosphorus, which indicated a square pyramidal structure.

EXAMPLE II

Example I was repeated, using a charge consisting of 53.7 g. (0.3 mole) of phenylphosphonous dichloride in the reaction flask and 65.1 g. (0.3 mole) of antimony pentafluoride in the dropping funnel. The antimony pentafluoride was added to the phenylphosphonous dichloride at such a rate that the temperature of the reaction mixture was maintained at 80° to 90° C. When the addition was complete, the crude product was separated by vacuum distillation and redistilled at atmospheric pressure. The yield of phenyltetrafluorophosphorane was 33 g. (60%).

Analysis

Calculated for $C_6H_5F_4P$: F, 41.30%; P, 16.84%.
Found: F, 41.56%, 41.80%; P, 17.01%, 17.24%.

EXAMPLE III

Example I was repeated employing 64.0 g. (0.3 mole) of isooctenylphosphonous dichloride in the reaction flask and 65.1 g. (0.3 mole) of antimony pentafluoride in the dropping funnel. The antimony pentafluoride was added to the isooctenylphosphonous dichloride at such a rate that the temperature of the reaction mixture was maintained at 50°±5° C. The product, isooctenyltetrafluorophosphorane, separated by distillation at reduced pressure, boiled at 60° C. at 3 mm.

Analysis

Calculated for $C_8H_{15}PF_4$: P, 14.20%; F, 34.90%.
Found: P, 12.87%; F, 32.90%.

Nuclear magnetic resonance examination indicated that the product had three equivalent fluorine atoms bound to the phosphorus and a fourth non-equivalent fluorine, which indicated a trigonal bipyramidal structure.

In the process of the present invention there may be used any hydrocarbon phosphorus compound of the formula $$R_nPCl_{3-n}$$

wherein R is a monovalent hydrocarbon radical, e.g., alkenyl, alkyl, aryl, aralkyl, or cycloalkyl radical, and $n$ is 1 to 3. Thus there may be reacted with antimony pentafluoride in the process of this invention the following: triphenylphosphine, tricyclohexylphosphine, triethylphosphine, ethylphosphonous dichloride, butylphosphonous dichloride, octylphosphonous dichloride, octenylphosphonous dichloride, butenylphosphonous dichloride, octadecylphosphonous dichloride, phenylphosphonous dichloride, tolylphosphonous dichloride, xylylphosphonous dichloride, benzylphosphonous dichloride, cyclohexylphosphonous dichloride, methylcyclohexylphosphonous dichloride, diethylphosphonous monochloride, dihexylphosphonous monochloride, diphenylphosphonous monochloride, di(methylcyclohexyl)phosphonous monochloride, dibenzylphosphonous monochloride, etc. The phosphonous dichlorides RPCl₂ are preferred and particularly the aryl- and alkenylphosphonous dichlorides.

Thus there are obtained from the aryl and alkenyl phosphorus compounds hydrocarbofluorophosphoranes of the formula $$R_nPF_{5-n}$$

wherein R is an aryl or alkenyl radical and $n$ is an integer from 1 to 3, including, in addition to the phenyltetrafluorophosphorane of Examples I and II and the isooctenyltetrafluorophosphorane of Example III, triphenyldifluorophosphorane, tolyltetrafluorophosphorane, xylyltetrafluorophosphorane, diphenyltrifluorophosphorane, butenyltetrafluorophosphorane, etc. The aryltetrafluorophosphoranes are preferred.

If antimony pentafluoride is used as the fluorinating agent, it may be present in amounts from 0.5 molar up to equimolar of the organic phosphorus compound. When antimony trifluoride is used, it may be present in amounts up to 1⅓ times the molar quantity of the organic phosphorus compound. In the latter case the oxidation is effected with antimony pentachloride, which may be present in any amount up to equimolar of the organic phosphorus compound. Usually the hydrocarbon phosphorus compound and stibinic halide/antimony fluoride are used in equimolar amounts and the fluoride in amount to yield $5-n$ atoms of fluorine per mole of $R_nPCl_{3-n}$ compound.

The antimony pentavalent fluoride composition is one which contains pentavalent antimony and fluoride, i.e., contains a pentavalent antimony halide and a fluoride. Suitable antimony compounds are antimony pentafluoride, antimony trichlorodifluoride, and mixtures of antimony trifluoride with antimony pentachloride.

In the examples above, the fluorination of the hydrocarbon phosphorus compound has been effected batchwise. If desired, however, the fluorination can be effected as a continuous operation.

Because of the reactivity of the hydrocarbon fluorophosphoranes with moisture to produce phosphonic compounds, it is critical that the fluorination be effected under conditions which exclude the presence of moisture. These conditions are readily obtained by sweeping the reactor with dry oxygen-free nitrogen before it is charged with the antimony fluoride and maintaining a blanket of nitrogen over the reaction mixture throughout the addition of the hydrocarbon phosphorous compound.

The reaction is effected at atmospheric pressure and this has advantages in simplifying equipment requirements.

The temperature at which the fluorination is effected is in the range of 40° to 120° C., but since the best yields are obtained at reasonable reaction rates within the more restricted range of 50° to 90° C., this embraces the conditions generally used and is preferred.

The hydrocarbon fluorophosphoranes of this invention having the formula $R_nPF_{5-n}$ in which R and $n$ have the previously indicated meanings, are useful as polymerization catalysts, as illustrated below.

EXAMPLE A

To 40 g. of tetrahydrofuran, purified by distillation from sodium, there was added 1.0 g. of tetrafluoroisooctenylphosphorane, prepared as in Example III, and the resultant mixture allowed to stand at room temperature. The viscous liquid obtained was washed with water and the solid polymer that remained was purified by dissolving it in tetrahydrofuran and reprecipitating it twice with water. The polymer thus obtained had an inherent viscosity of 1.60, indicating a molecular weight of about 200,000. The yield was 23 g.

EXAMPLE B

Forty grams of tetrahydrofuran was placed in a flask and the flask was then flushed with nitrogen. There was then added 1 g. of phenyltetrafluorophosphorane prepared as in Example I, and the mixture allowed to stand at room temperature. In 30 minutes the reaction mixture had darkened and in one hour it had thickened slightly. After 12 hours, standing at room temperature, the product was hard and somewhat gummy.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Fluorophosphoranes of the formula $$R_nPF_{5-n}$$

wherein R is a radical selected from the group consisting of monocyclic aryl and lower alkenyl and $n$ is an integer from 1 to 3.

2. A monocyclic aryltetrafluorophosphorane.

3. Phenyltetrafluorophosphorane.

4. Isooctenyltetrafluorophosphorane.

5. A lower alkenyltetrafluorophosphorane.

6. A process for the preparation of fluorophosphoranes of the formula $AR_nPF_{5-n}$, wherein Ar is a monocyclic aryl radical of no more than 18 carbons and $n$ is an integer from 1 to 3, which comprises reacting a phosphorous compound of the formula $Ar_nPCl_{3-n}$, wherein Ar and $n$ are as above, with a member of the group consisting of antimony pentafluoride, antimony trichlorodifluoride, and mixtures of antimony trifluoride with antimony pentachloride at 40–120° C. under substantially anhydrous conditions.

7. The process of claim 6 wherein the temperature is 50–90° C.

8. Process of claim 6 wherein phenylphosphonous dichloride is used.

9. A process for the preparation of fluorophosphoranes of the formula $R_nPF_{5-n}$, wherein R is a lower alkenyl radical and $n$ is an integer from 1 to 3, which comprises reacting $R_nPCl_{3-n}$, wherein R and $n$ are as above, with a member of the group consisting of antimony pentafluoride, antimony trichlorodifluoride, and mixtures of antimony trifluoride with antimony pentachloride, at 40–120° C. under substantially anhydrous conditions.

10. The process of claim 9 wherein the temperature is 50–90° C.

11. A process for the preparation of fluorophosphoranes which comprises reacting, at about 40–120° C. and under substantially anhydrous conditions, a phosphorus compound of the formula $$R_nPCl_{3-n},$$

wherein R is a hydrocarbon radical of no more than 18 carbons selected from the group consisting of alkenyl, alkyl, aryl, aralkyl, and cycloalkyl and $n$ is an integer from 1 to 3, with a member of the group consisting of antimony pentafluoride, antimony trichlorodifluoride, and mixtures of antimony trifluoride with antimony pentachloride.

12. The process of claim 11 wherein antimony pentafluoride is employed in amounts from 0.5 molar up to equimolar of the organic phosphorus compound.

13. The process of claim 11 wherein antimony trifluoride is employed in amounts up to 1⅓ times the molar quantity of the organic phosphorus compound.

14. The process of claim 11 wherein the reaction temperature is about 50–90° C.

15. Process of claim 9 wherein isooctenylphosphonous dichloride is used.

(References on following page)

References Cited in the file of this patent

UNITED STATES PATENTS

| | | |
|---|---|---|
| 1,930,129 | Midgeley et al. | Oct. 10, 1933 |
| 2,500,218 | Towne et al. | Mar. 14, 1950 |
| 2,727,073 | Craig et al. | Dec. 13, 1955 |

FOREIGN PATENTS

| | | |
|---|---|---|
| 734,187 | Great Britain | Jul. 27, 1955 |

OTHER REFERENCES

Goddard: Textbook of Inorganic Chemistry (1936), vol. XI, part III, pages 81 and 82.

Adams et al.: Organic Reaction, vol. II, pages 50–56 (1944), John Wiley & Sons, New York.

Kosolapoff: Organo-phosphorus Compounds, John Wiley & Sons, New York, 1950, page 58.